Nov. 16, 1937.   R. C. BRADLEY   2,099,463
REGISTER
Filed Nov. 22, 1933   2 Sheets-Sheet 1

INVENTOR
Richard C. Bradley
BY
James & Franklin
ATTORNEYS

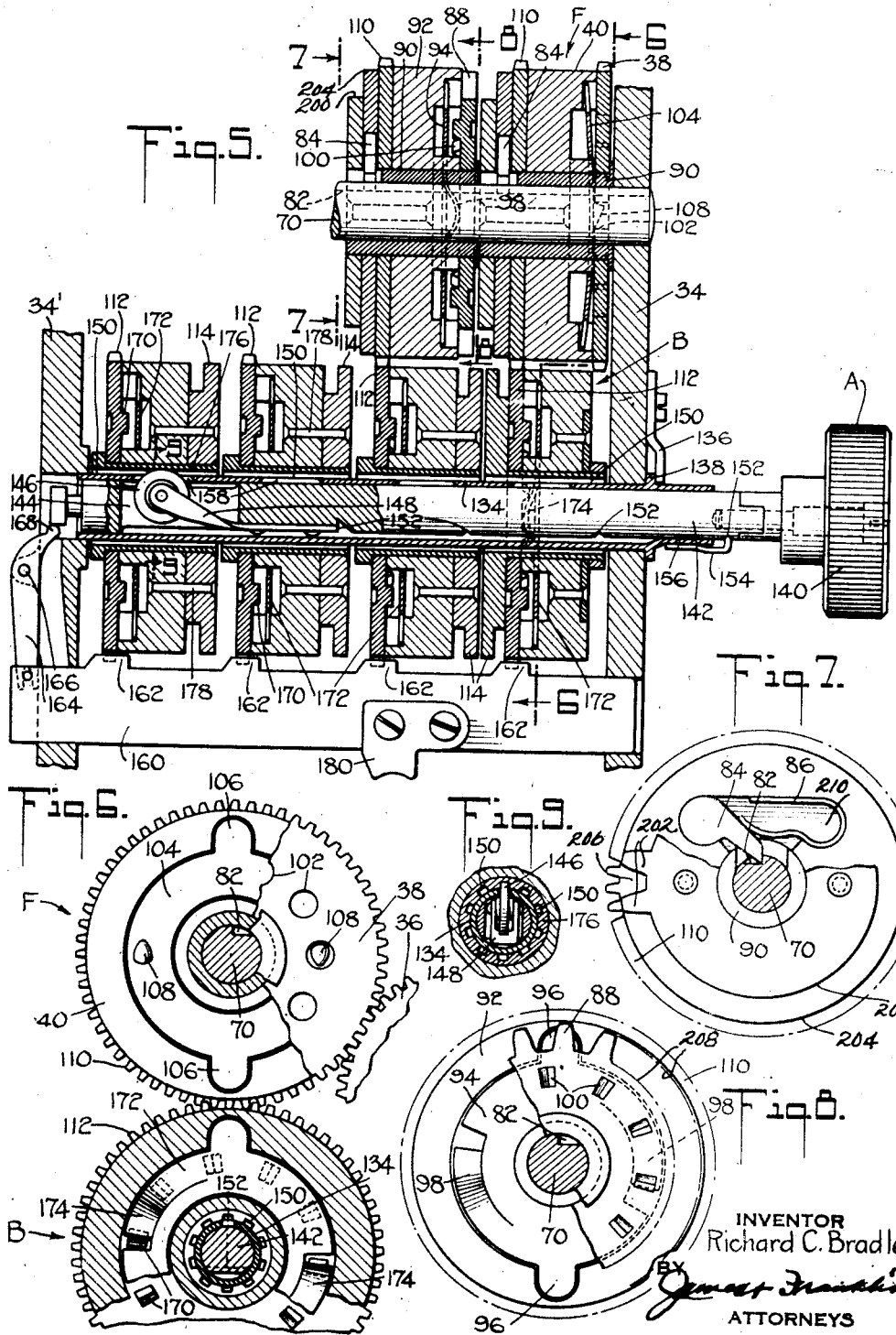

Patented Nov. 16, 1937

2,099,463

UNITED STATES PATENT OFFICE 2,099,463

REGISTER

Richard C. Bradley, Brooklyn, N. Y., assignor of one-half to Fred J. Bradley, St. Albans, N. Y.

Application November 22, 1933, Serial No. 699,120

15 Claims. (Cl. 235—132)

This invention relates to registers, and more particularly to registers for meters used for measuring the delivery of fluid in bulk.

Meters are commonly employed on tank trucks or the like for measuring the delivery of a fluid or liquid, for example, fuel oil or gasoline, and in many cases these meters are arranged with automatic trip mechanism which operates to provide a signal or to close a valve in the delivery pipe upon the passage of a predetermined quantity of fluid. This trip mechanism may be provided by the use of a set of backward running trip wheels adapted to be initially set to the desired quantity to be delivered or passed through the meter. The wheels run toward zero reading, and appropriate trip mechanism is readily provided, responsive to zero reading of the wheels.

One important disadvantage with such an arrangement is the fact that when the delivery is completed, there is no visual evidence of the quantity that has been delivered. A householder receiving a delivery of fuel oil may be skeptical and distrustful of an arrangement which simply registers zero at a time when he is supposed to have received a substantial quantity of fuel. Even the operator of the delivery truck is glad to have some visual indication of the quantity delivered.

It is accordingly one primary object of my invention to provide such meters with a check reading register or counter which runs in a forward direction and which clearly indicates the quantity of fluid delivered when the delivery is stopped, whether by tripping of the valve by the meter, or manual control, as when the tank is prematurely filled, it not having been as empty as thought, or insufficiently filled and thereupon supplemented by additional delivery.

A further object of my invention concerns the backward running wheels, and resides in the provision of improved selective adjustment means making possible the independent adjustment of all of the digit wheels to desired readings by the use of a single adjustment means.

Further objects of my invention center about the interconnection or gearing of the forward and backward running wheels, as well as the provision of automatically operable locking mechanism for locking the gearing during adjustment of the wheels to desired initial readings.

To the accomplishment of the foregoing and such other objects as will hereinafter appear, my invention consists in the register elements and their relation one to the other, as hereinafter are more particularly described in the specification and sought to be defined in the claims. The specification is accompanied by drawings in which:

Fig. 5 is an enlarged section taken in elevation in the plane of the line 5—5 in Fig. 2;

Fig. 6 is a partially sectioned detail taken in the plane of the line 6—6 of Fig. 5;

Fig. 7 is a partially sectioned detail taken in the plane of the line 7—7 of Fig. 5;

Fig. 8 is a partially sectional detail taken in the plane of the line 8—8 of Fig. 5; and Fig. 9 is a section taken in the plane of the line 9—9 of Fig. 5.

Figure 1:
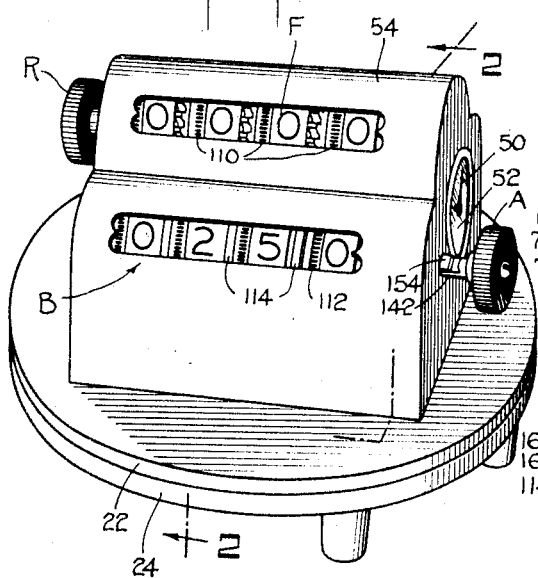
Fig. 1 is a perspective view of a meter head embodying features of my invention.

Referring to the drawings, the meter head is provided with three wheel trains, the first being a totalizer T located at the rear of the meter head, the second being a backward running trip wheel train B located at the front of the meter head, and the third being a forward running register F also located at the front of the meter head. The totalizing counter T is, of course, not susceptible of change, and simply progressively adds the total quantity of fluid passed through the meter. The counter F is provided with restoring means R for turning the same back to zero reading, this being done at the beginning of each delivery, so that the quantity indicated by this counter at the end of the delivery serves as a check upon the total delivery made. The backward running wheel train B is provided with a single adjustment means A affording adjustment of the same to any desired initial reading. By thus adjusting the train to the quantity of fluid to be delivered, it will obviously reach zero reading at the end of the delivery. This simple uniform alignment of all of the wheels is readily taken advantage of to provide an automatic trip or response.

Figure 2:
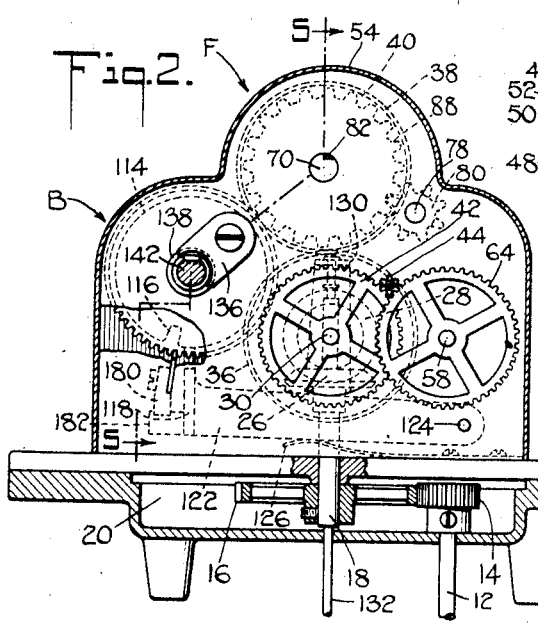
Fig. 2 is a section taken in elevation in the plane of the line 2—2 of Fig. 1.
Figure 4:
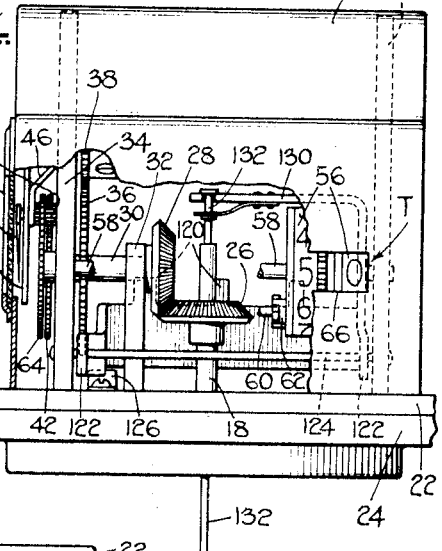
Fig. 4 is a rear elevation of the meter head with the cover partially cut away.

Considering the mechanism in greater detail, the drive from the meter body, which may be of the oscillating piston, wobble plate, or other conventional type, is transmitted to the meter head through spindle 12 (Fig. 2) carrying a pinion 14 meshing with gear 16 on hollow shaft 18. The gearing thus far described is housed in a space 20 provided between the upper and lower plates 22 and 24 of the base of the meter head. Referring now to Figs. 2 and 4, the hollow vertical shaft 18 carries a bevel gear 26 meshing with bevel gear 28 mounted on a horizontal shaft 30, the latter being journaled in a pedestal 32 and one main side wall 34 of the frame of the meter head. Shaft 30 has mounted thereon just inside of wall 34 a gear 36 which meshes directly with gear 38, fixed to the lowest order register wheel 40 of the counter F.

Shaft 30 further carries a gear 42 (Figs. 2 and 4) mounted outside of frame wall 34. This gear meshes with a pinion 44 journaled between frame wall 34 and a bracket 46 (Fig. 4) secured to wall 34. Bracket 46 further carries a stationary circular dial 48 on which a pointer 50 is movable, the pointer 50 being secured to pinion 44. This pointer is visible through a circular window 52 provided in the side wall of the sheet metal meter head housing or cover 54. The pointer 50 indicates the units of the totalizing counter T.

The totalizing counter T is of the straight reading type and comprises a series of register wheels 56 only two of which are shown in Fig. 4, and which register wheels are mounted on a rod or shaft 58 journaled between side plates 34 and 34' of the meter head. The register wheels are interconnected in the conventional manner by Geneva mechanism including a lock shaft 60 extending between the side plates of the frame and carrying locking pinions 62 only one of which is visible in Fig. 4. The lowest order register wheel of the totalizer T is secured to shaft 58, while the remaining wheels are freely mounted thereon. Shaft 58 carries at its outer extremity a gear 64 (Figs. 2 and 4) which meshes with pinion 44. The reading of totalizer T may be taken through an elongated horizontal slot or window 66 one end of which is shown in Fig. 4.

The significance of the term "straight reading type" is that the digits are read in a continuous straight line as though written, typewritten, or printed. This term is used in contradistinction to that form of register in which there are as many separate small circular dials as there are digits. The latter arrangement as commonly constructed employs a plate perforated for a series of shafts, and each perforation is surrounded by a small dial circle numbered from 1 to 10. There are a corresponding number of small pointers or indicators, each pointer cooperating with its own dial. The form of counter disclosed herein is, by way of distinction, designated "straight reading type".

Figure 3:
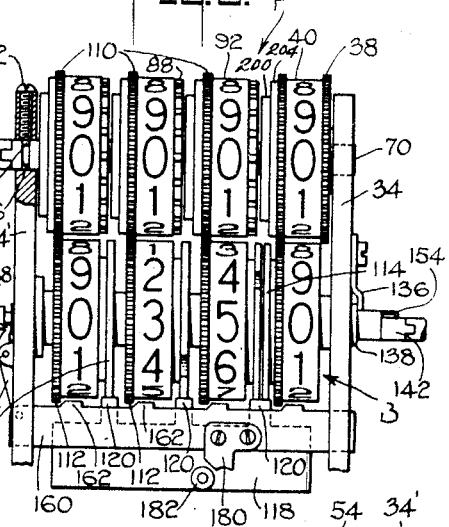
Fig. 3 is a front elevation of the meter head with the cover removed.

The counter F comprises a series of register wheels freely mounted for forward rotation on a rod 70 (Fig. 2) journaled in side plates 34 and 34' (Fig. 3). Rod 70 is restrained against axial movement by a screw 72 (Fig. 3) having a teat 74 entering a groove 76. The register wheels of counter F are interconnected by conventional Geneva gear mechanism including a lock shaft 78 (Fig. 2) extending between side plates 34 and 34' and carrying a series of "tens transfer" and lock pinions generally designated by the numeral 80 in Fig. 2, these pinions being located between the successive register wheels in the conventional manner.

The Geneva mechanism may be conventional and probably requires no detailed description, but briefly, each digit wheel of counter F, typically wheels 40 and 92 (Fig. 5), has associated with it a two tooth gear, indicated by numeral 200, and best shown in Fig. 7. The two teeth are marked 202. The disc 200 is secured to a disc 204 (Figs. 5 and 7) having a single recess 206 in registry with the space between teeth 202. The diameter of disc 204 is such as to lock the transfer pinion 80 against movement except when teeth 202 reach it, whereupon the recess 206 permits the pinion to move, the movement being caused by teeth 202. The transfer pinion 80 is conventional in having two sections, one section being fully toothed, and the other being mutilated by the absence of every other tooth. The latter section engages discs 200 and 204, and for each full rotation of the discs, is advanced one tooth, thus moving the unmutilated section two teeth. This section meshes with the fully toothed gear 88 previously referred to and best shown in Figs. 2, 3, 5 and 8. In Fig. 8, only half of the gear is shown, and on this half only three of the teeth are drawn in solid lines, the remainder being indicated by the broken lines 208. Gear 88 has twenty teeth (see Fig. 2) and is therefore moved one tenth of its periphery, or one digit, for each movement of the transfer pinion.

To set the counter to zero, a restoring handle R is provided, this handle being mounted directly on the end of shaft 70. Shaft 70 is provided with a right-angled or ratcheting spline or keyway 82 (Figs. 6 and 7) with which cooperates a series of pawls 84 carried by the individual register wheels, the pawls being resiliently moved toward shaft 70 by springs 86. The pawls and springs are set in recesses 210 and discs 204. The spline 82 and pawl 84 are so directed as to permit forward running of the register wheels. Upon rotation of handle R in proper direction, the pawls 84 are successively engaged, and the register wheels are thereby brought into alignment and finally rotated together to the desired zero reading, as shown in Fig. 1. This restoration to zero reading is accommodated without disturbing the reading of the totalizer and without jamming of the various Geneva or locking pinions of the counter F by reason of a friction clutch mounting between the register wheels per se and the Geneva gears forming a part thereof. Referring to Figs. 5 and 8, it will be noted that the Geneva gear 88 is rotatably mounted on a flanged hub or tube 90 and is thereby held in face to face relation with the side of the register wheel 92. The latter is hollowed out to receive a spring or friction plate 94 forced to turn with the register wheel by reason of diametrical lugs 96 and carrying outwardly bearing or outwardly convex spring fingers, the convex positions of which are indicated at the numerals 98, these portions being convex toward the Geneva gear 88, or convex toward the reader viewing Fig. 8 of the drawings. The Geneva gear 88 has struck inwardly thereof or toward plate 94 a series of detent teeth 100 which cooperate with spring fingers 98, the latter preferably being so broadly convexed as to approximately fill the space between any two successive detent teeth 100.

The lowest order register wheel 40 is provided with a generally similar spring or friction clutch between it and the gear 38. Referring to Figs. 5 and 6, it will be noted that gear 38 is provided with a series of holes 102, while register wheel 40 is provided with a spring plate 104 anchored in the register wheel at 106 and provided with outwardly struck ratchet teeth or projections 108. It will be evident that with either type of friction clutch, movement of the register wheel is afforded independently of the Geneva or spur gearing interconnecting the parts of the counter with one another and with the totalizer.

The backward running wheels B correspond to the register wheels F but differ in being driven in opposite direction. I take advantage of this fact to simplify the construction of the backward running train and to provide ample room for the trip mechanism cooperating therewith, by directly gearing each wheel of train B to the corresponding register wheel of counter F. This completely eliminates the necessity for Geneva mechanism on the wheel train B. Referring to Fig. 3, it will be evident that the register wheels of counter F are each provided with a spur gear 110 meshing with a corresponding spur gear 112 of each of the digit wheels B. For the sake of simplicity, the digit wheels F and B are preferably made equal in size; gears 110 and 112 are made equal in size; and the wheel trains are arranged in parallel juxtaposition to provide direct engagement of the gears, with consequent reversal in direction of rotation.

The digit wheels of the trip train are provided with cams 114 (see Figs. 3 and 5) each of which is circular in outline but provided with a single indentation or recess 116 (see Fig. 2). The cams are on the right of the digit wheels as viewed in Fig. 5, except that the cam of the lowest order digit wheel is on the left. The meter head is further provided with a trip bar 118 (see Figs. 2 and 3) having upwardly projecting teeth or followers 120 which ride on cams 114. Trip bar 118 is provided with rearwardly extending side arms 122 pivoted on the side walls 34, 34' of the frame by a rod 124 extending therethrough. The trip bar is normally urged upwardly by a leaf spring 126 mounted on frame plate 22 and bearing upwardly directly on the generally U-shaped trip member.

It will be evident that by so locating the camming recesses 116 that they will be at the bottom of the train or at the trip bar when the wheels read zero, the trip bar is permitted to rise under the influence of leaf spring 126 when all of the register wheels are aligned at zero. One side arm 122 of the trip bar is provided with an upwardly and then sidewardly extending angle arm 130 (Fig. 4) connected at its end to a vertical trip rod 132 which passes downwardly through the tubular shaft 18 of the driving mechanism of the meter. When the trip bar is elevated at zero reading, the rod or wire 132 is elevated, and this serves, through suitable connections (not shown) to provide a signal or, more preferably, to trip a suitable valve, usually of the butterfly type, in the delivery pipe.

To set the trip train B to desired initial reading is not so simple as to restore the counter F to zero reading, for each wheel of the trip train must be independently adjustable to any desired reading. To avoid the necessity for a plurality of adjusting handles, one for each trip wheel, I provide a single adjusting means A which may be used for adjusting any one of the trip wheels independently of the others. Referring to Figs. 5, 6 and 9, the trip wheels are mounted and freely rotatable on a tubular shaft 134 extending between side walls 34 and 34'. Tubular shaft 134 is itself rotatable but is held against axial movement by a strap or yoke 136 fixedly mounted on side wall 34 and bearing against a collar 138. The operating knob 140 is mounted at the outer end of an axially reciprocable rod 142, this rod being provided at its inner end with appropriate engagement means for engaging mating means on any one of the wheels. More specifically, in the present instance rod 142 is slotted at 144 and provided with a key preferably in the form of a wheel 146 which is resiliently urged outwardly by a spring mounting 148. The wheels are splined at their inner or hub surfaces to form a plurality of splines 150 best shown in Figs. 6 and 9. Each of these splines is dimensioned to receive the key wheel 146, the wheel being shown in engaged condition in Figs. 5 and 9. It will be evident that by moving the knob 140 axially, the key wheel 146 may be moved into engagement with any one of the wheels; and that by then rotating the knob, the wheel may be set to a desired reading.

To facilitate locating and holding the knob in desired axial position for any particular wheel, the rod 142 is preferably flattened on one side and provided with a series of detent notches 152, and the outer end of the tubular shaft 134 is provided with a spring detent 154 cooperating with the notches 152. The control rod 142 and tubular shaft 134 are caused to rotate together by reason of the flattened surface on the control rod, the outer end of the tubular shaft being flattened at 156 to mate therewith. The axial location of the control knob is further facilitated and determined by cooperation of the key wheel 146 with slots 158 cut through tubular shaft 134. These slots are, of course, essential to permit the key wheel to come into engagement with the splines on the wheels, and, by localizing the slots at each of the wheels instead of making the same continuous, the possibility of unintentionally moving two wheels at once is prevented.

In order to prevent movement of wheels other than that being adjusted, and in order to guard against the counters of the meter head being moved out of alignment during adjustment of the trip train, I provide locking means for then locking the gearing between the trip train and the counters against movement. Specifically, I provide a longitudinally reciprocable lock bar 160 movable in slots cut in frame walls 34 and 34'. The lock bar 160 is provided with teeth 162 so located as to slide into engagement with the teeth of gears 112 when the lock bar is moved from the unlocked position shown in Fig. 3 to the locked position shown in Fig. 5 of the drawings. The lock bar is moved by an angle lever 164 pivoted at 166 and the upper end 168 of which is designed to cooperate with the end of the axially movable control rod 142. When the trip counter is to be adjusted to a desired reading, it is first necessary to move the knob 140 outwardly, and this initial movement forces the end 168 of lever 164 to the right and downwardly, thus moving the lock bar 160 into locking position. When the train has been adjusted to desired reading, the knob 140 is finally pushed inwardly as far as it will go, at which time the lever 164 and lock bar 160 are moved to the positions shown in Fig. 3.

It will be understood that gears 112 are frictionally related to the wheels in order to permit the latter to be adjusted despite the locked condition of the gears. For this purpose the gears 112 are preferably provided with inwardly struck detent teeth 170 like the detent teeth 100 on the Geneva gears of the counter F, and which similarly cooperate with spring plates 172 housed and anchored within the wheels and provided with outwardly bearing spring fingers 174 cooperating with the detent teeth 170. The trip cams 114 are, of course, rigidly connected to the wheels, for the relation between zero reading and the trip point on the cam must remain fixed. In effect, the cams 114 form an integral part of the wheels, and the trip bar bears against marginal portions of the wheels which, instead of being truly circular, are cut away at one point to permit actuation of the trip bar. The parts of the wheel are held in assembled relation by the splined tubular hubs 176, while the wheels and cams 114 are locked together by rivets 178. In the particular meter head here shown, the lowest order wheel of train B differs in having cam 114 located on the same side of the wheel as gear 112, to provide ample clearance for primary gear 38 of counter F.

To move the trip bar downwardly out of engagement with the notches in the trip cams when beginning adjustment of the trip wheels, I provide on lock bar 160 a cam 180 adapted to cooperate with a cam follower roller 182 mounted on the trip bar 118 (see Figs. 2 and 3). The cam 180 and cam follower 182 are so related as to be disengaged, as shown in Fig. 3, when the lock bar is in unlocked position. When the lock bar is moved to its locked position, which takes place at the very beginning of the operation of adjusting the trip counter, the cam 180 bears against and forces the cam follower 182 downwardly and with it the trip bar. In the resulting position the teeth of the trip bar escape the trip cams. Upon completion of adjustment of the trip train, the lock bar 160 is moved to unlocked position, thereby releasing the trip bar for attempted upward movement.

The operation of the meter head may be summarized as follows. Assuming the meter to be used on a tank truck, upon arrival at the point of delivery, the counter F is restored to zero reading by simply rotating the knob R until zero reading is reached. The trip train B is adjusted to the desired quantity to be delivered by means of the knob A. To do this the knob is pulled outwardly to the desired digit wheel and then rotated to set the wheel at the desired reading. At the very beginning of the outward movement of the knob, the lock bar is moved to locked position and the trip bar moved downwardly. After the trip wheels have been set to desired reading, the knob A is pushed inwardly, thereby unlocking the gearing and releasing the trip bar for attempted upward movement. The delivery is then begun, the valve being interconnected with the meter head in such a manner as to be tripped and released to closed position upon movement of the trip wire extending from the meter head. As the delivery of fluid proceeds, the counter F indicates the amount delivered, while the train B runs backwardly toward zero. When zero reading is reached on train B, the trip bar is automatically actuated and the valve tripped to closed condition. At the same time, the counter F clearly indicates the amount delivered, thus avoiding dispute or misunderstanding. Should it become necessary to trip the valve by hand before the delivery is completed, or to supplement the first delivery by additional liquid, the counter F is available to indicate the total correct amount of the actual delivery made. Throughout the entire series of deliveries the totalizer is, of course, continuously adding the successive deliveries.

It is believed that the mode of constructing and using, as well as the many advantages of my improved meter head, will be apparent from the foregoing detailed description thereof. It will further be understood that while I have shown and described my invention in preferred form, many changes and modifications may be made in the structure disclosed, without departing from the spirit of the invention, defined in the following claims.

I claim:

1. A meter head including a plurality of indicator wheels, drive means for turning the same in response to the running of a meter or like mechanism, the wheels being so geared as to automatically move in the ratio of 100 to 10 to 1 etc., and manually movable means affording selective adjustment of said wheels to a desired initial reading, said means including a single operating knob movable for translation and for rotation, engagement means controlled thereby for engagement with any one of the wheels, and mating engagement means on each of the wheels, whereby all of the wheels may be independently adjusted to a desired reading by the single aforesaid operating knob, said manually movable means and said meter driven means being so related that the latter does not interfere with and is not responsive to operation of the manually movable means.

2. A meter head including a plurality of indicator wheels, drive means for turning the same in response to the running of a meter or like mechanism, the wheels being so geared as to automatically move in the ratio of 100 to 10 to 1 etc., and means affording selective adjustment of said wheels to a desired initial reading, said means including an axially reciprocable rod, an operating knob mounted at the outer end of said rod, engagement means at the inner end of the rod, and mating engagement means on the wheels, whereby all of the wheels may be independently adjusted to a desired reading by the aforesaid single operating knob, said selective adjustment means and said meter driven means being so related that the latter does not interfere with and is not responsive to operation of the selective adjustment means.

3. A meter head including a plurality of indicator wheels freely rotatable on a hollow support, drive means for turning the same in response to the running of a meter or like mechanism, the wheels being so geared as to automatically move in the ratio of 100 to 10 to 1, etc., and means affording selective adjustment of said wheels to a desired initial reading, said means including a rod axially reciprocable in the hollow support, an operating knob mounted at the outer end of said rod, a key resiliently urged radially outwardly at the inner end of the rod, keyways or splines cut in the hubs of the wheels, and detent means cooperating with appropriately spaced notches on the rod for establishing the axial positions of the rod resulting in mating of the key with the individual wheels, whereby all of the wheels may be independently adjusted to a desired reading by the aforesaid single operating knob, said selective adjustment means and said meter driven means being so related that the latter does not interfere with and is not responsive to operation of the selective adjustment means.

4. A meter head comprising a set of backward running trip wheels of the straight reading type, each of said wheels including an operating gear and friction clutch means therebetween permitting the wheel to be rotated independently of the operating gear, a lock bar movable into locking position to lock all of the operating gears of the wheels against movement, a trip bar resiliently urged into engagement with the marginal part of the peripheries of the wheels, said marginal peripheries being cut away at points corresponding to zero reading of the wheels, and a single adjustment means affording selective adjustment of each of said wheels to a desired initial reading.

5. A meter head comprising a set of backward running trip wheels, each of said wheels including an operating gear and friction clutch means therebetween permitting the wheel to be rotated independently of the operating gear, a lock bar movable into locking position to lock all of the operating gears of the wheels against movement, a trip bar resiliently urged into engagement with the marginal part of the peripheries of the wheels, said marginal peripheries being cut away at points corresponding to zero reading of the wheels, means for adjusting said wheels to desired initial reading, and means responsive to use of said adjusting means for moving the lock bar into locking position and said trip bar out of engagement.

6. A meter head comprising a set of backward running trip wheels of the straight reading type, each of said wheels including an operating gear and friction clutch means therebetween permitting the wheel to be rotated independently of the operating gear, a lock bar movable into locking position to lock all of the operating gears of the wheels against movement, a trip bar resiliently urged into engagement with the marginal part of the peripheries of the wheels, said marginal peripheries being cut away at points corresponding to zero reading of the wheels, and means affording selective adjustment of said wheels to a desired initial reading, said means including an axially reciprocable rod, an operating knob mounted at the outer end of said rod, engagement means at the inner end of the rod, and mating engagement means on each of the wheels.

7. A meter head comprising a set of backward running trip wheels freely rotatable on a hollow shaft, each of said wheels including an operating gear and friction clutch means therebetween permitting the wheel to be rotated independently of the operating gear, a lock bar movable into locking position to lock all of the operating gears of the wheels against movement, a trip bar resiliently urged into engagement with the marginal part of the peripheries of the wheels, said marginal peripheries being cut away at points corresponding to zero reading of the wheels, and means affording selective adjustment of said wheels to a desired initial reading, said means including a rod axially reciprocable in the hollow shaft, an operating knob mounted at the outer end of said rod, a key resiliently urged radially outwardly at the inner end of the rod, keyways or splines cut in the hubs of the wheels, and detent means cooperating with appropriately spaced notches on the rod for establishing the axial positions of the rod resulting in mating of the key with the individual wheels.

8. In a register, in combination, a set of backward running indicator wheels, means to set the same to a desired initial reading, a forward running counter including a set of counter wheels, means to set the same to an initial zero reading, means gearing each of said indicator wheels directly to the corresponding one of the counter wheels, whereby the indicator and counter wheels are given equal movements in opposite direction, the indicator and counter wheels being numbered in the same direction, and means whereby the means to set the backward running wheels to a desired reading does not change the reading of the forward running counter.

9. A meter head comprising a set of backward running indicator wheels, a set of forward running counter wheels, said sets of wheels being arranged in parallel juxtaposition, each indicator wheel being geared directly to a corresponding one of the counter wheels, and a plurality of clutches whereby each indicator wheel may be adjusted independently of the other indicator wheels and independently of the forward running counter.

10. A meter head comprising a set of backward running digited trip wheels of the straight reading type, means to set the same to a desired initial reading, trip mechanism responsive to zero reading of said trip wheels, a forward running counter of the straight reading type including a set of counter wheels, means to set the same to an initial zero reading, said sets of trip and counter wheels being arranged in parallel juxtaposition, each trip wheel being geared directly to a corresponding one of the counter wheels, and means whereby the means to set the backward running wheels to a desired reading does not change the reading of the forward running counter.

11. A meter head comprising a set of backward running indicator wheels, a set of forward running counter wheels, said sets of wheels being arranged in parallel juxtaposition, one only of said sets of wheels being provided with conventional transfer mechanism, each indicator wheel being geared directly to a corresponding one of the counter wheels, and a plurality of clutches whereby each indicator wheel may be adjusted independently of the other indicator wheels and independently of the forward running counter.

12. A meter head comprising a set of backward running digited trip wheels of the straight reading type, means to set the same to a desired initial reading, trip mechanism responsive to zero reading of said trip wheels, a set of forward running counter wheels forming a counter of the straight reading type, means to set the same to an initial zero reading, said sets of wheels being arranged in parallel juxtaposition, one only of said sets of wheels being provided with conventional transfer mechanism, each wheel of the other set being geared directly to a corresponding wheel of the first set, and means whereby the means to set the backward running wheels to a desired reading does not change the reading of the forward running counter.

13. A meter head comprising a set of backward running trip wheels of the straight reading type, a single adjustment means affording selective adjustment of said wheels to a desired initial reading, a set of forward running counter wheels of the straight reading type, means to set the same to an initial zero reading, said sets of wheels being arranged in parallel juxtaposition, one set being provided with the conventional transfer mechanism, each wheel of one set being geared directly to the corresponding wheel of the other set, and means responsive to use of the selective adjustment means for locking said gearing against movement.

14. A meter head comprising a set of backward running trip wheels, and means affording selective adjustment of said wheels to a desired initial reading, said means including an axially reciprocable rod, an operating knob mounted at the outer end of said rod, engagement means at the inner end of the rod, and mating engagement means on the wheels, whereby all of the wheels may be independently adjusted to a desired reading by the aforesaid single operating knob, a set of forward running counter wheels, means to set the same to an initial zero reading, said sets of wheels being arranged in parallel juxtaposition, one of said sets being provided with the conventional transfer mechanism, each wheel of one set being geared directly to the corresponding wheel of the other set, the wheels and gears being frictionally connected, and means responsive to use of the selective adjustment means for locking said gearing against movement.

15. A meter head comprising a set of backward running trip wheels of the straight reading type, each of said wheels including an operating gear and friction clutch means therebetween, a lock bar movable into locking position to lock all of the operating gears against movement, and means affording selective adjustment of said wheels to a desired initial reading, said means including an axially reciprocable rod, an operating knob mounted at the outer end of said rod, engagement means at the inner end of the rod, and mating engagement means on the wheels, a set of forward running counter wheels of the straight reading type, means to set the same to an initial zero reading, said sets of wheels being arranged in parallel juxtaposition, one set being provided with the conventional Geneva mechanism including a lock shaft and lock shaft pinions, each wheel of the other set being geared directly to the corresponding wheel of the first set, and means responsive to said selective adjustment means for moving the lock bar into locking position.

RICHARD C. BRADLEY.